Dec. 16, 1924.  1,519,231
O. P. BENJAMIN
STOP AND WASTE VALVE
Filed Dec. 23, 1922
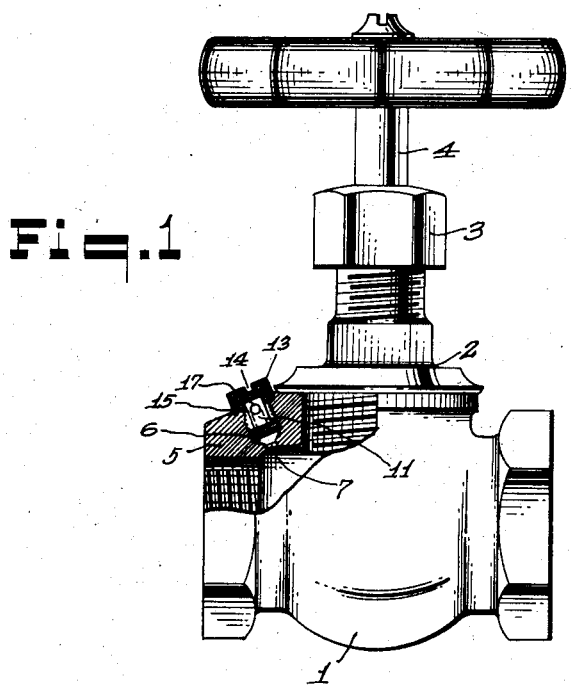
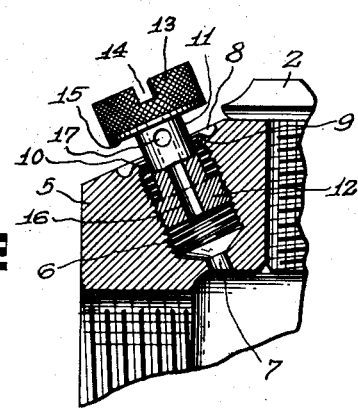
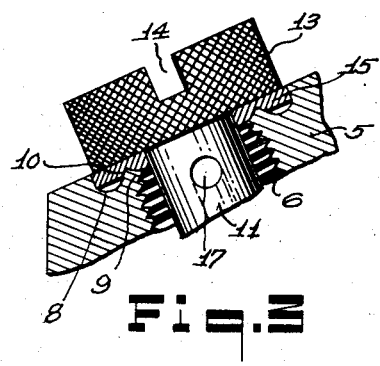
Inventor
Oscar P. Benjamin
By
Attorneys Patented Dec. 16, 1924.

1,519,231

UNITED STATES PATENT OFFICE.

OSCAR P. BENJAMIN, OF DETROIT, MICHIGAN, ASSIGNOR TO CAPITOL BRASS WORKS, OF DETROIT, MICHIGAN, A CORPORATION OF MICHIGAN.

STOP AND WASTE VALVE.

Application filed December 22, 1922. Serial No. 608,632.

*To all whom it may concern:*

Be it known that I, OSCAR P. BENJAMIN, a citizen of the United States of America, residing at Detroit, in the county of Wayne and State of Michigan, have invented certain new and useful Improvements in Stop and Waste Valves, of which the following is a specification, reference being had therein to the accompanying drawings.

This invention relates to stop or waste valves and has special reference to that class of globe valves which are provided with means for relieving pressure in a pipe line communicating with the valve. I am aware of globe valves having needle valves and the like for relieving excessive pressure, and from a manufacturing experience that such needle valve construction increases the cost of production and is not satisfactory in many particulars. For instance, the valve seats for needles cannot be readily cleaned and the needles, per se, become defective because of the accumulation of foreign matter and incrustations, and very often manufacturing imperfections interfere with proper seating of a needle valve and closing of the relief port of a globe valve.

My invention aims to provide a globe valve with a relief valve having an exterior valve seat, which can be easily manufactured, cleaned, and maintained in an operative condition. The valve also seats exteriorly of the globe valve and provision is made to prevent accidental displacement of the relief valve. At times such valves are surreptitiously removed or adjusted to the extent of becoming disengaged from the globe valve body, and this displacement I prevent by anchoring the valve so that it cannot become easily displaced, yet permit of removal when occasion requires. From a manufacturing standpoint there are other improvements over the present type of relief valves.

The construction entering into my invention will be hereinafter specifically described and then claimed and reference will now be had to the drawing wherein—

Figure 1 is a side elevation of a stop and waste valve, partly broken away and partly in section to show the auxiliary valve;

Fig. 2 is an enlarged detail sectional view of the valve in an open position, and Fig. 3 is a further enlargement of a portion of the valve in a closed position.

In the drawing, the reference numeral 1 denotes a globe valve body having a bonnet 2 and a stuffing box 3 for an adjustable valve stem 4 by which the body 1 may be opened or closed for or against the passage of water, steam, or any liquid or fluid therethrough. This valve is of a conventional form and by providing the body 1 with a boss or enlargement 5 it may be conveniently equipped with a relief, exhaust or waste auxiliary valve.

In the enlargement or boss 5 I form an angularly disposed bore 6 with its inner end communicating with the interior of the body 1 through a small port 7 and the walls of said bore are screwthreaded. At the outer end of the bore the enlargement or boss 5 is provided with an annular groove 8 concentric of the bore so as to provide an outstanding annular malleable wall or flange 9 having a cross sectional configuration affording an annular valve seat 10 set in or countersunk relative to the face of the enlargement or boss 5.

The reference numeral 11 denotes a valve stem having its inner end provided with an exteriorly screwthreaded head 12 in screwthreaded engagement with the walls of the bore 6 so that the stem may be adjusted longitudinally of the bore. On the outer end of the stem 11 is a knurled head 13 provided with a slot 14 to permit of a screw driver or other instrument being used for adjusting the valve stem. On the stem 11, against the inner face of the head 13, is a gasket or valve 15 corresponding in diameter to the groove 8 so that it may be forced into said groove and on to the seat 10 of the wall or flange 9, as shown in Fig. 3, to positively close the outer end of the bore 6.

In the valve stem 11 is a longitudinal passage 16 having its inner end open at the head 12 to communicate with the bore 6, and the outer end of the passage communicates with a lateral port 17 in the stem 11, which lateral port is adapted to communicate with the atmosphere when the valve stem 11 is in a valve open position, as shown in Fig. 2, otherwise the lateral port 17 is shut off from the atmosphere when the gasket 15 is seated on the flange or wall 9, as shown in Fig. 3.

To prevent the valve stem 11 from being screwed entirely out of the bore 6 and thus becoming displaced, the flange or wall 9 is peened, upset, inwardly reamed or otherwise operated upon to mutilate, distort, or contract the outermost threads of a bore 6, to somewhat restrict the outer end of the bore, and form an abutment which will prevent accidental removal of the valve stem, after it is once mounted in the bore. The restriction of the bore may be noted in Fig. 3 and reaming or bending the flange or wall 9 inwardly does not interfere with the valve seat 10 or forcible removal of the valve stem. As a matter of fact, it brings the seat closer to the stem and allows more room in the groove 8 for any crowding of the gasket 15 therein as the valve is closed.

From the foregoing it will be noted that the valve stem 11 effects closure of the bore 6 at the outer end thereof in contradistinction to a needle valve operating at the inner end of the bore, and it is apparent that a better seating action and positive closing of the valve can be accomplished when access may be easily had to the valve seat and the gasket which seats thereon. There is practically a double seal for the valve when closed because the gasket not only seats on the flange or wall 9, but is crowded into and compressed in the groove 8. So far no leakage has ever occurred and I find that the valve can be conveniently located on top of the valve body where easy access may be had to said valve.

One embodiment of my invention has been illustrated, but it is to be understood that the structural elements are susceptible to such change and modifications as fall within the scope of the appended claims.

What I claim is:—

1. The combination of a globe valve having an enlargement, a relief valve having a stem adjustable in the enlargement of said globe valve, and means retaining said relief valve stem in the enlargement of said globe valve and affording an exterior seat for said relief valve.

2. The combination set forth in claim 1, wherein said means is in the form of an annular peened in flange.

3. The combination set forth in claim 1, the valve for engaging said seat comprising a head on said relief valve stem, and the stem having a head in screw threaded engagement with the globe valve enlargement.

4. In a device of the class described, the combination of a globe valve body, a threaded relief valve thereon, said valve having a head, and means forming a seat for said head, said means also forming a stop for preventing the removal of said valve from said body.

In testimony whereof I affix my signature in presence of two witnesses.

OSCAR P. BENJAMIN.

Witnesses:
 L. W. TILDEN,
 OTTO F. BARTHEL.